United States Patent [19]

Leenhouts

[11] 4,208,623
[45] Jun. 17, 1980

[54] CHOPPING POWER SUPPLY FOR A BIFILAR STEPPING MOTOR

[75] Inventor: Albert C. Leenhouts, Harwinton, Conn.

[73] Assignee: The Superior Electric Company, Bristol, Conn.

[21] Appl. No.: 909,590

[22] Filed: May 25, 1978

[51] Int. Cl.² ............................................. G05B 19/40
[52] U.S. Cl. .................................................. 318/696
[58] Field of Search ........................ 318/685, 696, 341

[56] References Cited

U.S. PATENT DOCUMENTS

| 3,812,413 | 5/1974 | Keidl ...................................... 318/696 |
| 3,824,440 | 7/1974 | McIntosh ............................... 318/696 |
| 3,826,966 | 7/1974 | Nagasska et al. ..................... 318/696 |
| 4,127,801 | 11/1978 | Leenhouts ............................. 318/696 |

*Primary Examiner*—Gene Z. Rubinson
*Attorney, Agent, or Firm*—Thomas L. Tully

[57] ABSTRACT

A chopping power supply controls power to the bifilar winding phases of a stepping motor with the power being applied to one winding until a selectable value of current flows and is then removed for a fixed duration to have induced current in the other winding be directed back to the power source while still producing usable magnetic flux and in which each phase has its own chopper circuit with both being operated at superaudible rates at least during standstill operation.

13 Claims, 2 Drawing Figures

CHOPPING POWER SUPPLY FOR A BIFILAR STEPPING MOTOR

Stepping motors of the type with which the present circuit is usable are operated from standstill to high stepping speeds with the power required generally varying with the speed. One manner of controlling power so as to essentially equate the power supplied with the motor's instantaneous requirement has been to supply power in discontinuous intervals by chopping the connection between the power source and the motor. While such chopping power supplies have heretofore been suggested, they tend to be tailored to a specific motor, voltage of the power source, operating speed range, specific stepping sequence, etc., in addition to being apt to have configurations which may inefficiently utilize the power and/or require a relatively large number of power switching components.

It is accordingly an object of the present invention to provide a chopper circuit for a bifilar wound stepping motor which is usable with and over a wide range of motors and operating conditions with only a minimum of easily altered modifications being required, if at all.

Another object of the present invention is to achieve the above object with a chopper circuit that efficiently utilizes the power consumed and requires a minimum number of power switching devices but yet maintains a substantially constant torque while minimizing audible noise that may be generated by the motor during standstill operation.

A further object of the present invention is to provide a chopper circuit for a bifilar stepping motor which is susceptible to high density integration, relatively economical to manufacture and reliable and durable in use.

In carrying out the present invention, the chopping power supply circuit is used with a bifilar wound two phase stepping motor in which each phase is divided into two windings with each winding being separately energizable but inductively associated. Each phase has its own chopper circuit for alternatively connecting and disconnecting the energized winding to a unidirectional power source. The chopper circuit energizes a winding until a selectable value of current passes through the winding from the power source and then disconnects the winding for a set time period. The time period is selected to cause the chopper circuit to alternate at a super audible rate, at least a standstill which among other advantages, minimizes objections to noise that may be generated by the motor.

During the disconnect duration, the deenergization of the energized winding induces a current initially of essentially the same value as the energizing current in the other winding, and the present power supply directs this induced current to continue the same magnetization as the energizing current, thereby maintaining essentially constant, the winding produced magnetization. Moreover, the induced current is directed back to the power source for subsequent use, thereby enhancing the efficiency of the present power supply. The high chopping rate enables maintaining the values of both the energizing and induced currents within a small range while still permitting the energizing current to flow for longer periods as the motor may require during its movement.

Other features and advantages will hereinafter appear.

Figure 1:
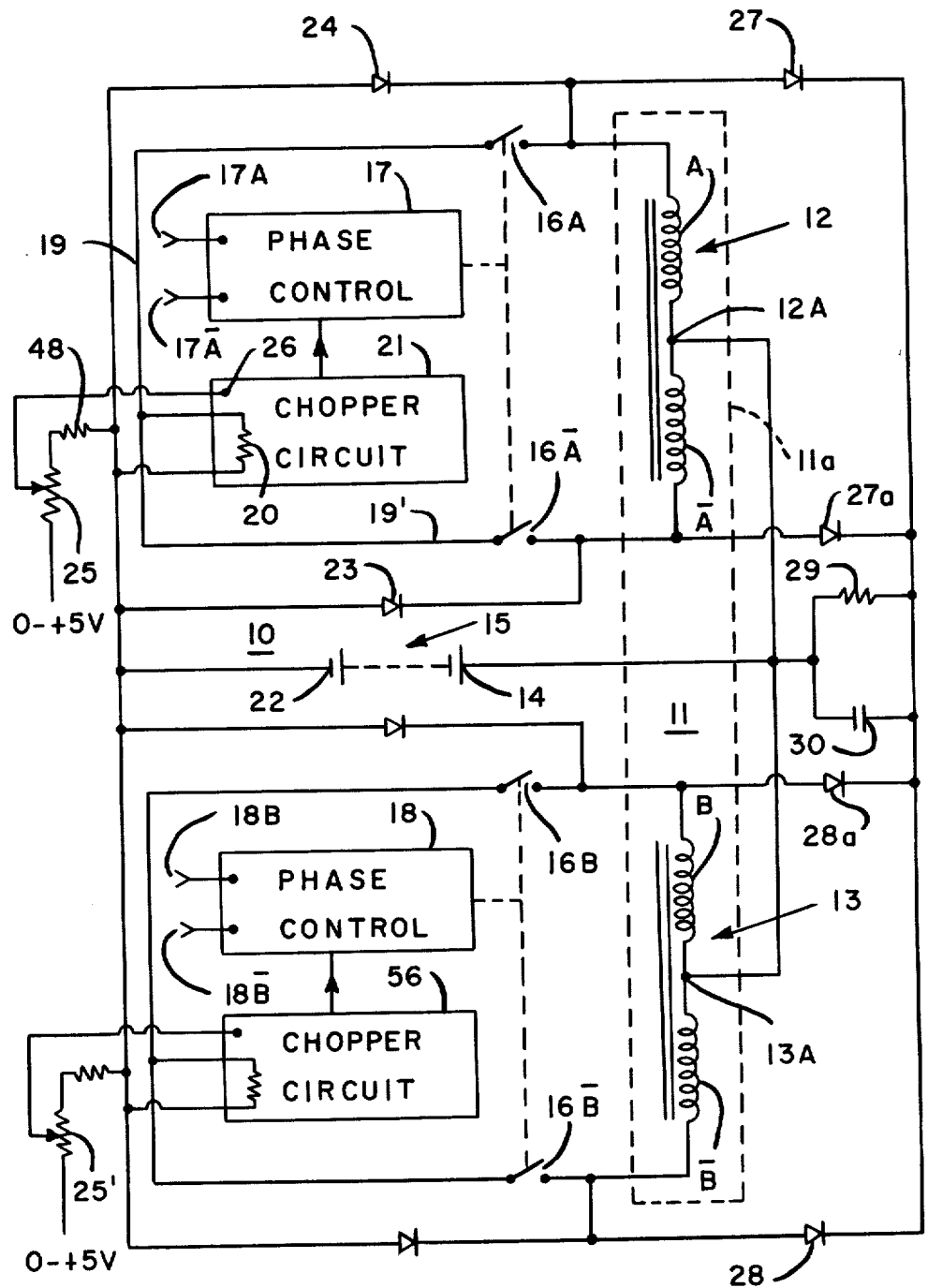
FIG. 1 is a block and electrical schematic diagram of the power supply of the present invention.

Referring to the drawing, the power supply for a bifilar stepping motor is generally indicated by the reference numeral 10 and is used to control the current that energizes a stepping motor 11 contained within a dotted line block 11a. The motor 11 is a two phase bifilar wound stepping motor having a first phase 12 formed to provide two windings A and $\bar{A}$ and a second phase 13 that is also formed with two windings B and $\bar{B}$. Each phase has a common junction 12A and 13A located between their two windings with the common junctions being connected in parallel to a positive terminal 14 of a unidirectional power source 15.

The other end of each winding is connected in series with its own switching device, 16A, 16$\bar{A}$, 16B and 16$\bar{B}$, respectively. Each switching device, when closed, connects its associated winding to be energized by the power source 15. The switching devices 16A and 16$\bar{A}$ are connected to be operated by a phase control 17 while the switching devices 16B and 16$\bar{B}$ are operated by a phase control 18, as indicated by the dotted connecting lines between the switching devices and the phase controls. The phase control 17 receives signals on input terminals 17A and 17$\bar{A}$ which controls which one of the switching devices is to be closed and similarly the phase control 18 has two input terminals 18B and 18$\bar{B}$ on which signals controlling the switching devices 16B and 16$\bar{B}$ are received.

One form of stepping motor which may be employed with the power supply of the present invention is shown in U.S. Pat. No. 3,968,416, assigned to the assignee of the present invention, and it further discloses a pulse to step circuit for receiving the string of pulses and changing the energization of the motor in accordance with a selected sequence to provide a step for each pulse. Thus, for each pulse received, signals are applied to the terminals 17A, 17$\bar{A}$, 18B and 18$\bar{B}$ which causes energization of the motor by closure of their associated switching devices. For a four step sequence, windings AB, $\bar{A}$B, $\bar{A}\bar{B}$, A$\bar{B}$, AB, etc., are energized, while for an eight step sequence, the windings are energized in the sequence AB, B, $\bar{A}$B, $\bar{A}$, $\bar{A}\bar{B}$, $\bar{B}$, A$\bar{B}$, A, AB, etc. Thus, in any one of the two sequences, only one winding of each of the phases is energized at a time and both or only one phase may be energized.

Referring to the phase 12, when the switch 16A is closed by a signal on the terminal 17A, current flows from the positive terminal 14 through the winding A, a lead 19 and a resistor 20 contained within a chopper circuit 21 to a negative or ground terminal 22 of the power source 15. When the switching device 16$\bar{A}$ is closed by a signal at the terminal 17$\bar{A}$ and with the switching device 16A caused to be open by the removal of the signal on the terminal 17A, the path of current flow is through the winding $\bar{A}$, a lead 19' and the resistor 20 to the negative terminal 22. As will be more after fully set forth, the chopper circuit 21 is interconnected with its phase control to intermittently open and close the switching device that is set closed by the signal on the terminal 17A or 17$\bar{A}$.

Assuming that the switching device 16A is set closed, when the chopper circuit 21 causes opening thereof, the stoppage of current flow in the winding A from the power source 15 induces a current to flow in winding $\bar{A}$ which flows through the junction 12A to the positive terminal 14, and inversely through a diode 23 to the negative terminal 22. Similarly, for a signal which would cause closure of switching device 16A' with 16A̅ open, the induced current will have a path from the winding A that is through the common junction 12A to the positive terminal 14 and inversely through a diode 24 to the negative terminal 22.

The windings A and A̅ physically consist of a plurality of serially connected coils with each winding having a coil on the same magnetic pole of the motor as the other winding so that the coils have the same core and hence the windings are inductively associated. Further, the windings are identical to have the same number of turns on each coil. The energization of a winding by the power supply by closure of its associated switching device produces a magnetic flux in the poles and when the energization from the power supply ceases, current is induced in the other winding and it flows in the direction which causes the other winding to produce the same magnetization of the magnetic poles as that produced by the power supply energized winding. Thus, irrespective of whether a switching device is open or closed (the other one of the phase will always be open), there is current flowing in the winding 12 to maintain the magnetic flux. The efficiency of the present power supply is increased by directing the induced current back to the power source where it may be used to supply energizing power upon the next closure of a switching device. Thus, both power source and induced currents provide an essentially constant magnetization.

In accordance with the present invention, the chopper circuit 21 operates to maintain a switching device closed until the value of the energizing current through the resistor 20 reaches a value that is determined by the setting of an adjustable resistor 25 connected to a zero to 5 volt positive reference source and a terminal 26 in the chopper circuit 21. When this value is reached, the chopper circuit opens the switching device for a set period of time during which time induced current flows to maintain the magnetization.

After completion of the induced current set time, the chopper circuit 21 again closes the switching device to energize the winding from the power supply for the time required for the set value of current to be attained at which time, the switching device is again opened for the set period.

The fixed time period during which the chopper circuit 21 maintains the switching device open is made extremely short which thus maintains the induced and energizing current values within a small range, assures that the open time will not interfere with the extent of the closed time of the switching device required to meet the motor's instantaneous power requirements, and renders inaudible, at least during standstill operation, any noise generated in the motor.

One induced current period that has been found acceptable in achieving the above objects is 20 microseconds. During standstill, the rate of rise of the energizing current is somewhat slower than the rate of decay of the induced current and, if the decay time is 20 micro-seconds, the energizing time is typically 30 micro-seconds so that the energization to the motor is switched 20,000 times per second. As this rate is above the range of audible human sensitivity, any noise produced by a part of the motor oscillating at this frequency will not be audible. As the motor's speed is increased, it generates a counter voltage which increases the duration that a switching device must be closed to increase the energizing current to the set value. This increased energizing time decreases the rate of switching by the chopper circuit to within the audible range but any noise generated by switching in the motor is usually overwhelmed by other motor or part driven noises and hence does not become objectionable. Moreover, even with an increased energizing time, the induced current is still maintained within a small range by its fixed period. When the motor's speed approaches a few thousand steps per second, the time that each winding is closed by the phase control 17 becomes so short that the power source may not cause the value of energizing current to attain the set value and cause operation of the chopper circuit fixed off period. The motor then is connected to the power source to be continuously energized.

It is also noted that while typically the energizing time is longer than the induced current time, during a rapid deceleration condition, for example, the times may be reversed because the need for energizing current decreases and it attains its set value more rapidly than in other typical operating conditions.

As there is leakage inductance in the motor which could cause excessive voltages to occur across a switching device when it is opened, there is provided a supression circuit which includes diodes 27, 27a, 28 and 28a together with a resistor 29 and a capacitor 30 interconnected as shown.

Figure 2:
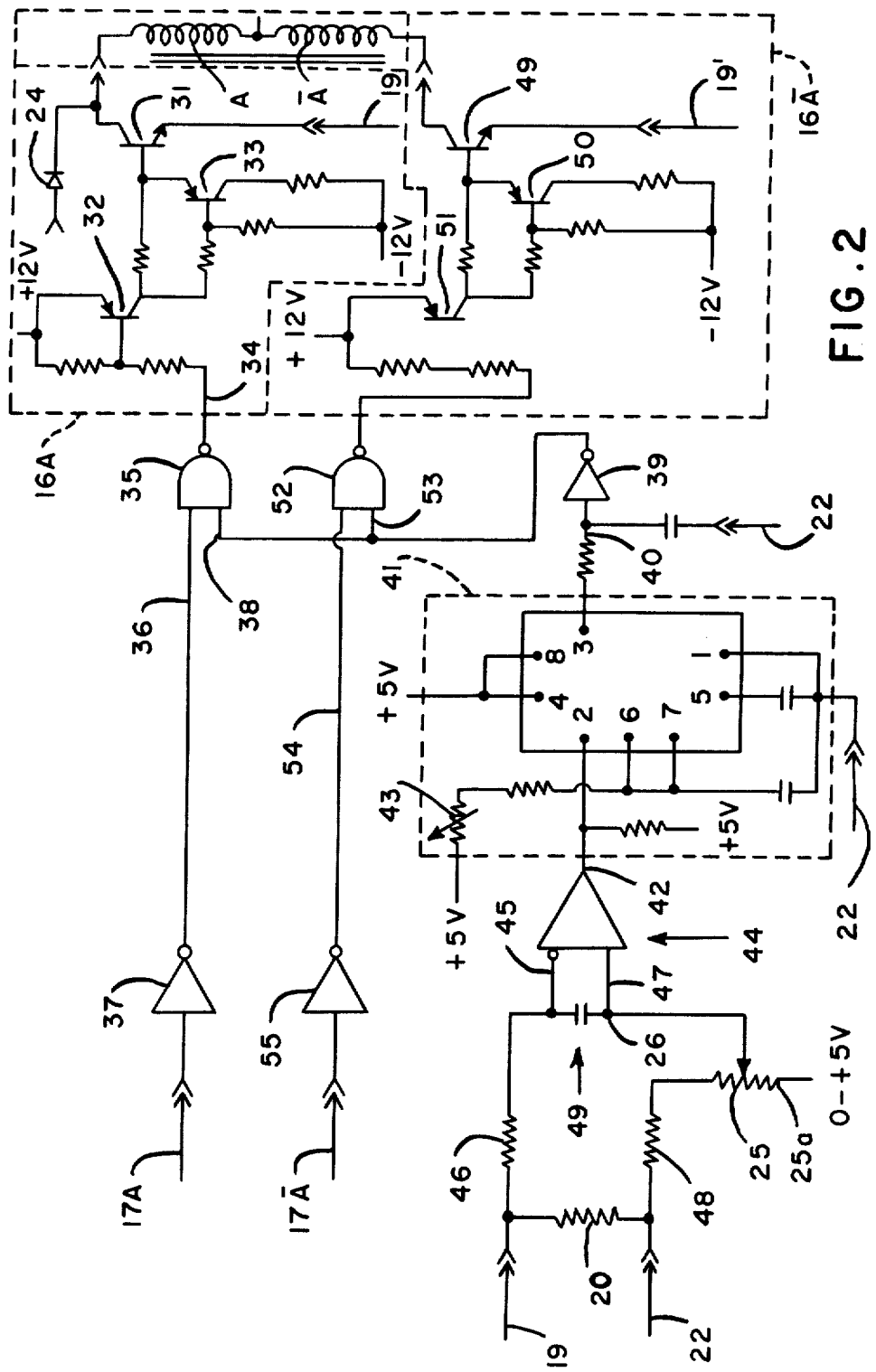
FIG. 2 is an electrical schematic diagram of the switching and chopping circuit for one phase of the motor.

Referring to FIG. 2, the switching device 16A includes a transistor 31 having its collector connected to the end of winding A and the diode 24 while its emitter is connected to the lead 19. The base of the transistor 31 is connected to a line driver amplifier which includes transistors 32 and 33 connected as shown and which is responsive to a voltage on a lead 34. A low voltage causes the transistor 31 to conduct while a high voltage effects non-conduction of transistor 31. The line driver amplifier may be a Fairchild type 9636 integrated circuit if desired rather than the discrete components shown.

The lead 34 is connected to the output of an open collector, type 7426, NAND gate 35 which receives on one input 36 a signal provided at the terminal 17A. A low voltage signal on the terminal 17A will produce through a type 7414 Schmitt trigger inverter 37, a high voltage on the input 36 which, if concurrent with a high voltage on the other input 38 of the gate 35, will produce a low voltage on the lead 34 and cause conduction of the transistor 31.

The input 38 is connected to the output of an inverting Schmitt trigger inverter 39 which receives a voltage signal on a lead 40 connected to the output of a monostable timer included within a block 41. The timer 41 is a type 555 connected in a conventional manner to produce a high output on the lead 40 each time it receives a triggering signal on a lead 42 with the time being adjustable but being essentially set at 20 micro-seconds by the use of an adjustable resistor 43. Accordingly, each time the timer 41 is triggered, the lead 40 becomes high which produces a low signal on the input 38 and even when concurrent with a high signal on the input 36, produces a high signal on the lead 34 to cause the transistor 31 to be rendered non-conducting.

The timer output then shifts to low until the next triggering signal is received and during this low period, the lead 38 has a high voltage thereon which when concurrent with a high voltage on the input 36, shifts the transistor 31 to its conducting state.

The triggering lead 42 is connected to the output of a comparator 44 which may be type LM311 and it has one input 45 connected through a resistor 46 to the lead 19. Its other input 47 is connected to the tap of the adjustable resistor 25 which is the connection to the terminal 26 of the chopper circuit indicated in FIG. 1. One end 25a of the resistor 25 is connected to an adjustable value positive voltage reference source indicated specifically as 0–+5V while its other end 25b is connected to the negative terminal 22 through a resistor 48. A capacitor 49 is connected between the two inputs 45 and 47.

The resistor 22 has a quite low value on the order of 0.1 ohms and thus produces on the input 45 a small positive voltage that is directly proportional to the value of energizing current flowing through either winding. The other input 47 receives a constant value of voltage. When the two values are equal, the comparator 44 changes its output on the lead 42 from high to low which in turn produces a low voltage on the input 38 to cause the transistor 31 to become non-conducting for the time fixed by the timer. Upon completion of this fixed time, the transistor 31 is automatically rendered conducting and remains so until the next triggering signal is again applied on the lead 42 by the energizing current attaining the value of current that produces on the lead 45, a voltage value that is equal to the value set by the resistor 25. The next triggering signal will be produced resulting in the opening of transistor 31 for the fixed time. The chopper circuit 21 will continue to repeat the on-off states of transistor 31 at a rate that at standstill, is 20 KHz but which changes in accordance with the motor's power requirements.

While the above description has related to the winding A, the switching device 16Ā is identical thereto and includes a transistor 49 identical to the transistor 31. In addition, the base of the transistor 49 is connected to an identical line driver amplifier that includes transistors 50 and 51 with the latter having its base connected to the output of an open collector inverting NAND gate 52. The latter has one of its two inputs 53 connected to be in parallel with the input 38 while its other input 54 is connected to the output of a Schmitt trigger inverter 55 having an input connected to the phase control terminal 17Ā. The transistor 49 functions in the same manner as the transistor 31 so that irrespective of which of the two windings A or Ā is energized by a signal on the terminals 17A and 17Ā, the chopper circuit 21 will effect the shifting between the conducting and nonconducting states of the switching transistor that controls the energization of its associated winding from the power source.

While FIG. 2 shows the electrical schematic diagram for controlling energization of only phase 12, the circuit for controlling the energization of phase 13 is identical so that phase control 18 is the same as 17, chopper circuit 56 the same as circuit 21 and switching devices 16B and 16B̄ are identical in structure and function to switching devices 16A and 16Ā. The phase 12 has the resistor 25 for setting the value of current while the phase 13 has an identical resistor 25' with the resistors preferably being adjusted to have the same set value of current in each phase. If desired, a resistor common to both for providing the same reference voltage to each phase may be used. In the specific embodiment shown, the only common element between the two phases for controlling energization is the power supply excluding the suppression circuit. Thus, each phase is energized independently of the other phase and thus an eight step energizing sequence may be followed while still controlling the power supplied to the motor.

With the above construction, the value of the energizing current is continuously monitored in a manner which is independent of the voltage of the power supply since the signal utilized is the voltage drop across the resistor 25, a small value of positive voltage such as 0.5v for 5 amperes energizing current. This enables the present system to be used with motors requiring voltages over a range of perhaps 6–120 volts without any change. However, it may be necessary, if the voltage and/or current exceeds the rating of the switching devices such as transistors 31 and 49, to change such transistors with the remainder of the system remaining the same. One typically used transistor is Motorola type MJ10,000.

The resistor 25 is connected to a constant voltage source of 0 to +5 volts thus providing with its tap, a wide range which in turn provides a wide range in which the value of energizing current may be set. One range has been found to be on the order of 20 to 1 with good linearity, the latter being aided by the capacitor 49. Such ability enhances the universal use of the present system with it being noted that as the value of energizing current may be altered by changing the value of constant voltage applied to the resistor 25, the present system is susceptable to fractional stepping that supplies the proper values of voltage to each resistor 25 to produce the different values of energizing current required for each fractional step.

The power supply, instead of the battery shown, is typically an AC to DC convertor having smoothing capacitors which are capable of storing the induced current directed thereto. This storage tends to provide operating efficiencies of the present system approaching 90%.

It will accordingly be understood that there has been disclosed a circuit for controlling the amount of power supplied to a stepping motor in accordance with the needs of the motor. The circuit senses when the energizing current has achieved a set value and then interrupts the power for a fixed time period before again supplying energizing current. While at standstill, the interruption time is near the duration of the energizing time, but as the motor's speed and power requirements change, the ratio of these times change to meet the motor's energy requirements. During the interruption time, an induced current flows which continues the same magnetization as the energizing current thus maintaining the motor's torque and it is directed back to the power supply for storage. The off time is further selected to be of a short duration to maintain the magnetization currents within a small range, minimize objectionable audible noise that may be generated and assure that the motor will receive its energizing requirements.

Variations and modifications may be made within the scope of the claims and portions of the improvements may be used without others.

I claim:

1. A power supply for bifilar windings constituting one phase of a stepping motor comprising a source of unidirectional power, an end of each winding being connected to form a common junction that is connected to one side of the power supply, a switching device connected between the other end of each winding and the other side of the power source, phase control means connected to the switching devices for receiving a signal to close one of the switching devices, chopper means interconnected with the phase control means to alternately open and close the one switching device and by-pass means connected in parallel with each switching device between the other end of each winding and the other side of the power source for conduction of current flow in the opposite direction to current flow through the switching device, said windings being inductively associated and wound to produce the same magnetization for energizing current flowing from the power source through the common junction and current induced in the other winding and flowing in the opposite direction through the by-pass means associated with the other switching device and the common junction to the power source whereby the flow of induced current maintains magnetization when the one switching device is open.

2. The invention as defined in claim 1 in which each winding is essentially identical to have the induced current be essentially equal initially in value to the value of the energizing current upon disconnection whereby the induced current initially produces magnetization essentially equal to that produced by the energizing current.

3. The invention as defined in claim 1 in which each by-pass means consists of a diode through which only induced current flows.

4. The invention as defined in claim 1 in which the motor has a second phase having bifilar windings and a second power supply connected to the second phase and the power source, said second power supply being essentially identical to said first mentioned power supply.

5. The invention as defined in claim 1 in which the chopper means includes means for sensing the value of energizing current flowing and opening the one switching device upon the energizing current attaining a selected value.

6. The invention as defined in claim 5 in which the chopper means includes timer means for maintaining the one switching device open for a constant duration and closes the one switching device after expiration of the constant duration.

7. The invention as defined in claim 6 in which the constant duration has a period that causes the chopper means to normally open and close the one switching device at a rate that is higher than the normal audible frequency at least standstill operation of the motor.

8. The invention as defined in claim 7 in which the extent of the constant open duration is set to be somewhat less than the duration that the switching device is closed during at least standstill operation of the motor.

9. The invention as defined in claim 7 in which the timer means includes means for adjusting the extent of the constant open duration to about 20 micro-seconds.

10. The invention as defined in claim 1 in which the other side of the power supply is at ground potential, in which the chopper means includes means connected in series with the one switching device and the ground to have the energizing current flow therethrough and produce a voltage singal having a value directly proportional to the value of energizing current flowing, said signal having a value within a small range above the ground potential of the other side whereby the voltage signal is independent of the voltage provided by the power source.

11. The invention as defined in claim 10 in which there are means for providing a unidirectional reference voltage and in which the chopper means includes a comparator for comparing the values of the voltage signal and the reference voltage and producing a triggering signal when the value of the former is at least equal to the value of the latter.

12. The invention as defined in claim 11 in which the reference voltage means includes means for adjusting the value of the reference voltage whereby the maximum value of energizing current to the motor may be altered for different motors.

13. The invention as defined in claim 12 in which there is a reference power source for providing a settable value of voltage within a range to the reference voltage means and in which the value of the reference voltage is altered by a change in the value of the voltage from the reference power source.

* * * * *